United States Patent [19]
Yamawaki et al.

[11] 3,909,601
[45] Sept. 30, 1975

[54] DIGITAL TYPE ELECTRONIC CONTROL SYSTEM

[75] Inventors: Masao Yamawaki, Handa; Masakazu Ninomiya, Kariya, both of Japan

[73] Assignee: Nippondenso Co., Ltd., Kariya, Japan

[22] Filed: Mar. 20, 1974

[21] Appl. No.: 453,159

[30] Foreign Application Priority Data
Mar. 21, 1973 Japan.............................. 48-32437

[52] U.S. Cl...... 235/151.1; 123/32 EA; 235/150.21
[51] Int. Cl.².......................................... G05B 15/02
[58] Field of Search......... 235/150.21, 150.2, 151.1, 235/151; 123/32 EA, 32 AE; 340/172.5

[56] References Cited
UNITED STATES PATENTS

| | | |
|---|---|---|
| 3,689,753 | 9/1972 | Williams et al. ............ 235/150.21 X |
| 3,816,717 | 6/1974 | Yoshida et al................. 235/150.21 |
| 3,835,819 | 9/1974 | Anderson, Jr. ............ 235/150.21 X |
| 3,838,397 | 9/1974 | Watson et al.............. 235/150.21 X |

*Primary Examiner*—Joseph F. Ruggiero
*Attorney, Agent, or Firm*—Cushman, Darby & Cushman

[57] ABSTRACT

A digital type electronic control system adapted for fuel injection control for an internal combustion engine, etc., in which displacement of a controlled object is detected and converted into a digital signal, a main pattern controlled variable preliminarily set in a controlled variable memory circuit is read out according to said digital signal and a correction variable is read out from an auxiliary pattern preliminarily set on the basis of fine division of one part of the displacement of said controlled object in an auxiliary memory circuit, thereby to control said controlled object according to said controlled variable and said correction variable.

10 Claims, 13 Drawing Figures

DIGITAL TYPE ELECTRONIC CONTROL SYSTEM

BACKGROUND OF THE INVENTION

1. Field of the Invention

This invention relates to digital type electronic control and more particularly to a digital type electronic control system for achieving high precision control with the use of memory circuits of small capacity, adapted for the fuel injection control in an internal combustion engine, etc.

2. Description of the Prior Art

In a conventional digital type electronic controller, higher controlling accuracy could be achieved only by providing such a memory circuit which enabled a finer division of a pattern preliminarily set in the controller and hence by providing a higher accuracy approximation to an analog quantity. Such a memory circuit must inevitably have a larger capacity. Thus, the circuit structure became complicated and expensive. When the capacity of said memory circuit was limited, a large improvement in the controlling accuracy was impossible.

SUMMARY OF THE INVENTION

This invention is intended to solve said drawbacks and to provide a digital type electronic control system capable of achieving a high accurate control without changing the capacity of a main controlled variable memory circuit but with an addition of an auxiliary memory circuit of a small capacity.

An object of the present invention is to provide a digital type electronic control system including an auxiliary memory circuit of a small capacity for finely dividing a necessary portion of a main pattern as well as a controlled variable memory circuit for the main pattern so as to achieve a high accurate control without changing the main pattern, thereby simplifying and minimizing the structure compared with the case of using only one controlled variable memory circuit.

Another object of this invention is to provide a digital type electronic control system having a compact and simple structure without changing the capacity of the controlled variable memory circuits so as to remarkably decrease the exhaust gas during idling by controlling the fuel injection, by detecting the suction negative pressure in the internal combustion engine with a displacement detector, reading out the fuel injection from the controlled variable memory circuit, reading out the correcting fuel injection in the idling state from an auxiliary memory circuit, and controlling the fuel injection in an internal combustion engine with said fuel injection and said compensating fuel injection.

According to an embodiment of this invention, there is provided a digital type electronic control system in which the displacement of a controlled object is detected and converted into a digital signal, a controlling quantity is read out from the main pattern preliminarily set in the controlled variable memory circuit according to said digital signal, further a correcting controlled variable is read out from an auxiliary pattern preliminarily set in an auxiliary memory circuit corresponding to fine division of a portion of the displacement of said controlled object, and said controlled object is controlled according to said controlled variable and said auxiliary correction variable.

DESCRIPTION OF THE PREFERRED EMBODIMENT

Description will be hereinbelow made of the embodiment shown in the figures.

Figure 1A:
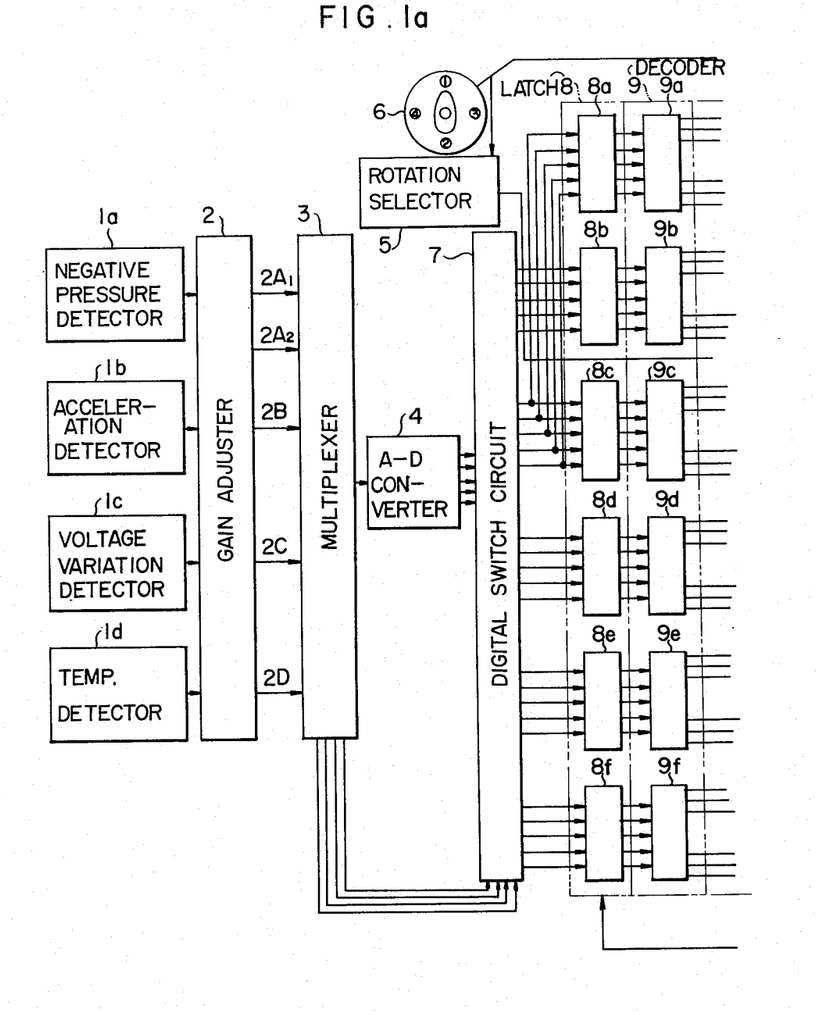
FIGS. 1a and 1b are in combination a block diagram of an embodiment of a digital type electronic control system according to this invention.
Figure 1B:
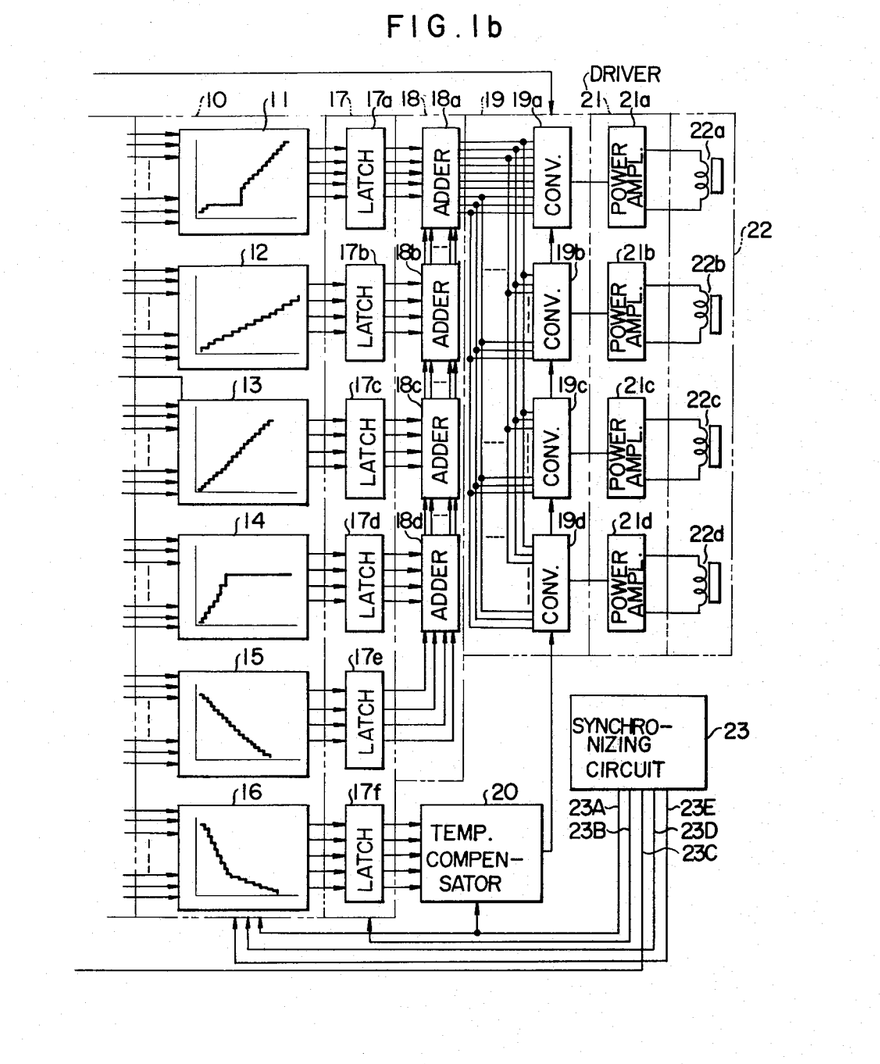

Referring to FIGS. 1 and 1b showing an embodiment of an electronic control system for achieving digital type fuel injection control in an internal combustion engine, a negative pressure detector $1a$ detects the suction negative pressure in an internal combustion engine and generates a negative pressure detected voltage, an acceleration detector $1b$ detects the magnitude of the acceleration and generates an acceleration detected voltage, a voltage variation detector $1c$ detects the voltage of the power source, and a temperature detector $1d$ detects the engine temperature and generates an engine temperature detected voltage by using a thermosensitive element such as a thermistor, the resistance of which varies according to the temperature of the coolant water. A gain adjustor 2 adjusts the gain for the output detecting signals of said detectors $1a$, $1b$, $1c$ and $1d$. The gain adjustor 2 provides two kinds of gain for the negative pressure detected voltage from the output of said negative pressure detector $1a$, one for the main negative pressure voltage $2A_2$ for the main pattern and the other for the idling negative pressure voltage $2A_1$ for the auxiliary pattern. Similarly, the gain adjustor 2 provides the acceleration voltage $2B$, the power source variation voltage $2C$ and the engine temperature voltage $2D$. A multiplexer 3 selects the output voltages $2A_1$, $2A_2$, $2B$, $2C$, and $2D$ from said gain adjustor 2 and supplies them to the next stage successively. An analog-digital converter (referred to as A-D converter hereinbelow) 4 converts analog signals from said multiplexer 3 to digital signals. A rotation selector circuit 5 generates a selection signal only in a required rotation range. A distributor 6 generates a rotation signal in synchronism with the rotation of the engine and supplies the rotation signal to said rotation selector circuit 5. A digital switch circuit 7 is switched in synchronism with said multiplexer 3 and supplies the input digital signal at that moment to a predetermined output terminal among the five output terminals. A detected value latch circuit 8 comprises latches 8a, 8b, 8c, 8d, 8e, and 8f. A decoder circuit 9 converts the digital signals of 5 bits from said latch circuit into read-out signals of 32 bits, and comprises decoders 9a, 9b, 9c, 9d, 9e, and 9f. A memory circuit 10 includes various patterns which are set preliminarily. A controlled variable memory circuit 11 stores a main pattern of 32 bits input - 32 bits output of a controlled variable which is set preliminarily and reads out a digital signal of 5 bits indicating an injection variable in correspondence to the suction negative pressure. An auxiliary memory circuit 12 stores an auxiliary pattern of 32 bits input - 16 bits output which is set on the basis of fine division of one portion of said main pattern, i.e. correction quantities for the suction negative pressure in the idling state, and reads out a digital signal of 4 bits indicating a compensating variable. A rotation compensating memory circuit 13 stores a rotation pattern of 32 bits input - 16 bit output for the rotation compensation and reads out a digital signal of 4 bits. An acceleration increment compensating memory circuit 14 stores an accleration increment compensating pattern of 32 bits input - 16 bits output for the acceleration increment compensation and reads out a digital signal of 4 bits. A voltage compensating memory circuit 15 stores a voltage compensating pattern of 32 bits input - 16 bits output for the voltage compensation and reads out a digital signal of 4 bits. A temperature compensating memory circuit 16 stores a temperature compensating pattern of 32 bits input - 16 bits output for temperature compensation and reads out a digital signal of 5 bits. An injection latch circuit 17 includes latches 17a, 17b, 17c, 17d, 17e, and 17f which may be similar to the latches 8a, 8b, 8c, 8d, 8e, and 8f of said detection latch circuit 8. An adder circuit 18 includes adders 18a, 18b, 18c, and 18d. A sum-time width converter 19 converts the total sum from the output of said adder 18a into a time width and includes converters 19a, 19b, 19c, and 19d for the respective cylinders, which successively achieve conversion in synchronism with the rotation signal from the distributor 6 and generate injection pulses. A temperature compensating controller circuit 20 alters the frequency of a time converting clock pulses for said sum-time width converter circuit 19 in correspondence with the 5 bits signal from the latch 17f in said injection latch circuit 17 to achieve the temperature compensation. A driving circuit 21 includes a power amplifiers 21a, 21b, 21c, and 21d for power-amplifying the injection pulses from said converters 19a, 19b, 19c, and 19d. An electromagnetic injector 22 includes electromagnetic valves 22a, 22b, 22c, and 22d which are disposed in the respective cylinders of the internal combustion engine and opened in response to the signals supplied from said power amplifiers 21a, 21b, 21c, and 21d. The valve opening time indicates the fuel injection quantity. A sychronizing circuit 23 synchronizes latch circuits 8 and 17 to start the memory write-in control therewith for memorizing the detected values and injection variable as well as the memory circuit to start the read-out control and also supplies the standard clock pulses to the temperature compensating control circuit 20.

The outline of the operation of said structure will be described hereinbelow. When the multiplexer 3 selects the idling negative pressure voltage $2A_1$ from the outputs of the gain adjustor 2 which is obtained by gain-adjusting the detected voltage from the negative pressure detector 1a, this idling negative pressure voltage $2A_1$ is converted into a digital signal of 5 bits in the A - D converter 4 and this digital signal is introduced to the latch 8b in the detection latch circuit 8, the decoder 9b and then the auxiliary memory circuit 12 set with an auxiliary pattern for idling correction, through the digital switch circuit 7. Thereby, a correcting variable of 4 bits is read out from said auxiliary memory circuit 12 and written in the latch 17b in the injection latch circuit 17. Similarly, when the main negative pressure voltage $2A_2$ is selected in the multiplexer 3, a digital signal corresponding to this main negative pressure voltage $2A_2$ is introduced to the control memory circuit 11. Thus, a controlled variable of 5 bits representing fuel injection variable is read out from the memory circuit 11 and written in the latch 17a in the injection latch circuit 17. Further, said digital signal corresponding to the main negative pressure voltage $2A_2$ is also introduced into the rotation compensating memory circuit 13. Only when the rotation selection circuit 5 generates a selection signal indicating that the rotation of the engine is within a predetermined range, a rotation compensating signal of 4 bits is read out from said rotation compensating memory circuit 13 and written in the latch 17c in the injection latch circuit 17. When the multiplexer 3 selects the acceleration voltage 2B obtained by gain-adjusting the detected voltage from the acceleration detector 1b, a digital signal corresponding to this acceleration voltage 2B is introduced into the acceleration increment compensating memory circuit 14. Then, an acceleration increment compensating signal of 4 bits is read out from said memory circuit 14 and written in the latch 17d in the injection latch circuit 17. In similar ways, a voltage compensating signal of 4 bits and a temperature compensating signal of 5 bits are read out from the voltage compensating memory circuit 15 and the temperature compensating memory circuit 16 and written in the latches 17e and 17f in the injection latch circuit 17 by the use of signals corresponding to the power source voltage 2C and the engine temperature voltage 2D, respectively. After the above writing operations into the injection latch circuit 17, the values written in the five latches 17a, 17b, 17c, 17d, and 17e are added in the four adders 18a, 18b, 18c, and 18d in the adder circuit 18 to generate the total sum at the output of the adder 18a. This total sum is applied to the sum-time width converter 19. In the converter 19, the respective converters 19a, 19b, 19c, and 19d are successively operated in synchronism with the rotation signal from the distributor 6 and generate injection pulses indicating the variable of injection. Here, the frequency of the time-converting clock pulses is changed in the temperature compensating control circuit 20 to achieve the temperature compensation. The injection pulses are power-amplified by the respective amplifiers 21a, 21b, 21c, and 21d and successively open the respective electromagnetic valves 22a, 22b, 22c, and 22d to inject the fuel into the respective cylinders.

Now, the details of the present device will be described referring to the detailed circuit diagrams of FIGS. 2 to 7.

Figure 2:
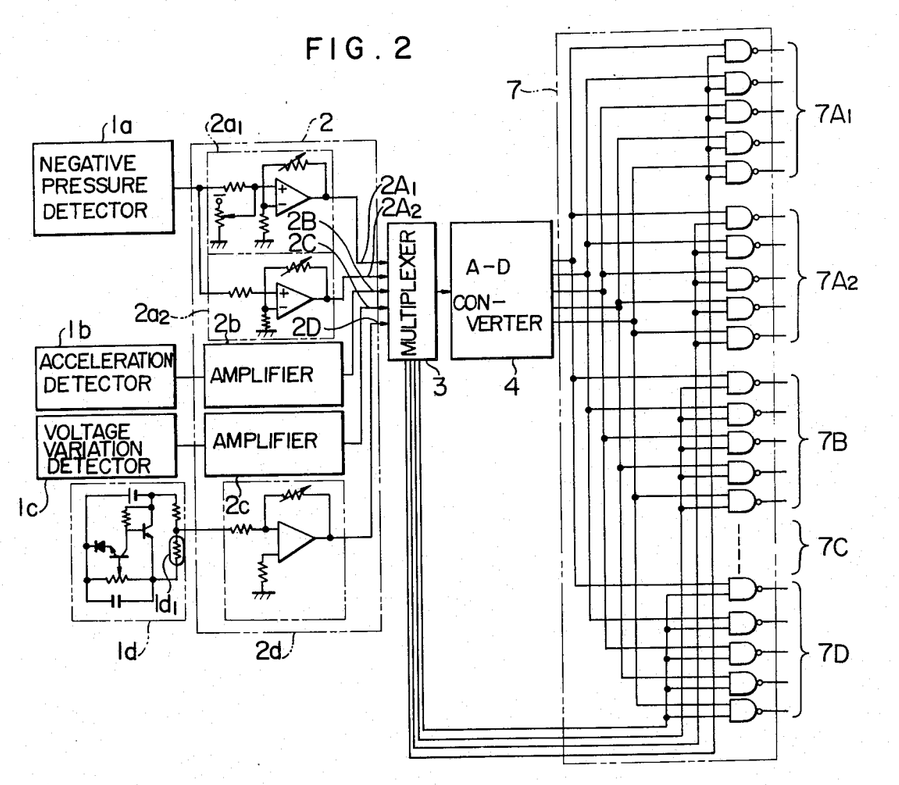
FIG. 2 is an electric circuit diagram of an embodiment of the partial circuit from the detector to the digital switch circuit.

FIG. 2 shows the electric connection of the detectors 1a, 1b, 1c, and 1d, the gain adjustor 2, the multiplexer 3, the A-D converter 4, and the digital switch circuit 7. The negative pressure detector 1a may be formed of a conventionally known one used in fuel injection electronic controllers, for example, one in which a diaphragm is displaced according to negative pressure and this displacement is transferred to a sliding contact in a sliding resistor to derive a negative pressure detecting voltage. The detected voltage is applied to the amplifiers $2a_1$ and $2a_2$ in the gain adjustor 2 to generate an idling negative pressure voltage $2A_1$ and a main negative pressure voltage $2A_2$ at the respective outputs. The acceleration detector 1b may be formed of a well known one which comprises a generator utilizing the rotation of a magnet assembled in a throttle valve. The detected voltage is applied to the amplifier 2b of the similar structure with said amplifier $2a_2$ to generate an acceleration voltage 2B at the output. The voltage variation detector 1C may employ the source voltage for activating the electromagnetic valve as the detected voltage and applies it to the amplifier 2c of the similar structure to said amplifier $2a_2$ to generate a power source variation voltage at the output. The temperature detector 1d may include a thermistor $1d_1$ which changes the resistance in accordance with the change in the engine temperature and converts the resistance change into an engine temperature detecting voltage. The engine temperature detecting voltage is applied to the amplifier 2d of the polarity inversion type to generate an engine temperature voltage 2D at the output. The multiplexer 3 for successively selecting these five detected voltages $2A_1$, $2A_2$, 2B, 2C, and 2D in analog signals may be a 8-channel analog multiplexer HI-1828 manufactured by Harris Co. The A-D converter 4 for converting the selected analog signal at the output into a digital signal utilizes a well known 5 bits circuit. The digital signal of this output is applied to the digital switch circuit 7 synchronized with the selection operation of said multiplexer 3, and generates digital signals $7A_1$, $7A_2$, 7B, 7C, and 7D of 5 bits at respective output terminals corresponding to said detected voltages $2A_1$, $2A_2$, 2B, 2C and 2D. The main portion of the two series of the circuits of the detection latch circuit 8, the decoder circuit 9, the memory circuit 10, the injection latch circuit 17, and the adder circuit 18 to which said digital signals $7A_1$, $7A_2$, 7B, 7C, and 7D are applied is shown in FIG. 3.

Figure 3A:
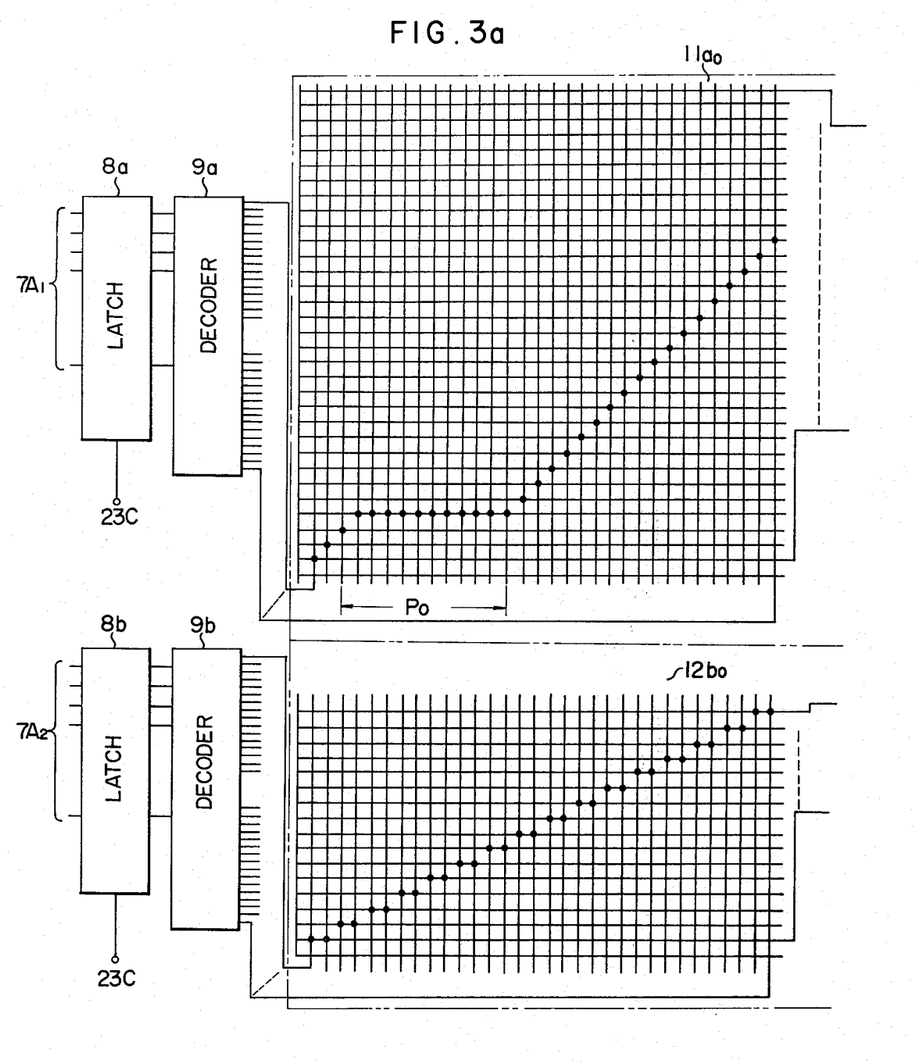
FIGS. 3a and 3b are in combination an electric circuit diagram of an embodiment of the partial circuit from the latch circuit to the adder circuit.
Figure 3B:
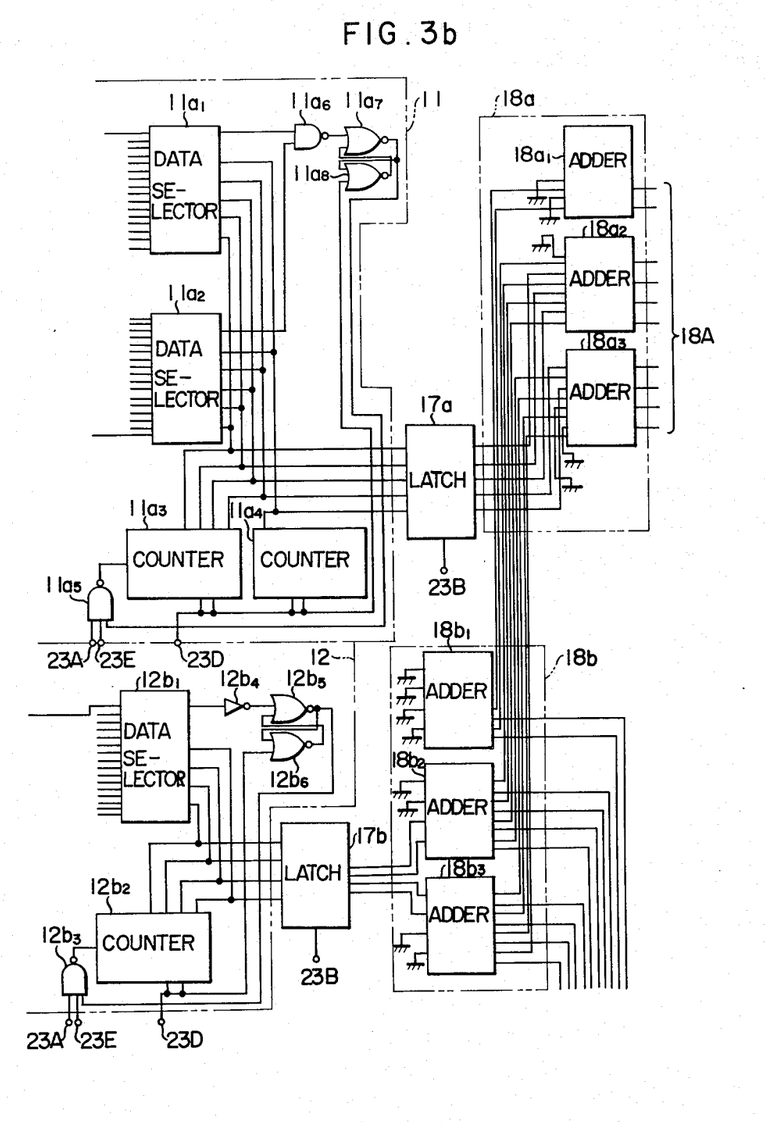

In FIGS. 3a and 3b, the latch 8a in the detection latch circuit 8 in which the digital signal of 5 bits $7A_1$ at the output of the digital switch circuit 7 is written in synchronism with the write-in signal from the terminal 23C may be formed of a circuit known by the trade name 74, 100 manufactured by Texas Instruments of USA (referred to as TI hereinbelow). The output of this latch 8a is converted into a signal of 32 bits for reading out the controlling quantity in the decoder 9a in the decoder circuit 9. Other latches 8b, 8c, 8d, 8e, and 8f may be also made of the similar circuits to the latch 8a. All the decoders 9a, 9b, 9c, 9d, 9e, and 9f may be formed of circuits known by the trade name 74,154 of TI. In the controlled variable memory circuit 11 to which the output signal of 32 bits from said decoder 9a is applied, the main pattern portion $11a_0$ has a diode matrix of a capacity of 32 bits - 32 bits capable of ROM (Read On Memory) arrangement and stores the main pattern. An injection signal of 32 bits representing the injection variable is read out from said main program by the output signal of 32 bits from said decoder 9a in accordance with said main negative pressure voltage $2A_2$. Data selectors $11a_1$ and $11a_2$ may be formed of the circuit 74,150 (trade name of Data Selectors-Multiplexers) of TI. The counters $11a_3$ and $11a_4$ may be formed of the circuit 7,493 (trade name) of TI. Numerals $11a_5$ and $11a_6$ are NAND gates, and $11a_7$ and $11a_8$ NOR gates forming a flip-flop. In the memory circuit 11 of the above structure, a decimal value read out from said main program $11a_0$ is converted into the binary code to provide a controlled variable of 5 bits. This controlled variable is written in the latch 17a in the injection latch circuit 17. Similarly, in the auxiliary memory circuit 12, a correcting variable corresponding to said digital signal $7A_2$ in the idling state is written in the latch 17b. The auxiliary memory circuit 12 is basically similar to said controlled variable memory circuit 11 except the fact that the auxiliary pattern portion $12b_0$ has a capacity of 32 bits - 16 bits and thus a correcting variable of 4 bits (in place of 5 bits) is read out from the auxiliary pattern. In the circuit, numeral $12b_1$ is a data selector, $12b_2$ a counter, $12b_3$ a NAND gate, $12b_4$ an inverter, and $12b_5$ and $12b_6$ NOR gates.

Figure 4:
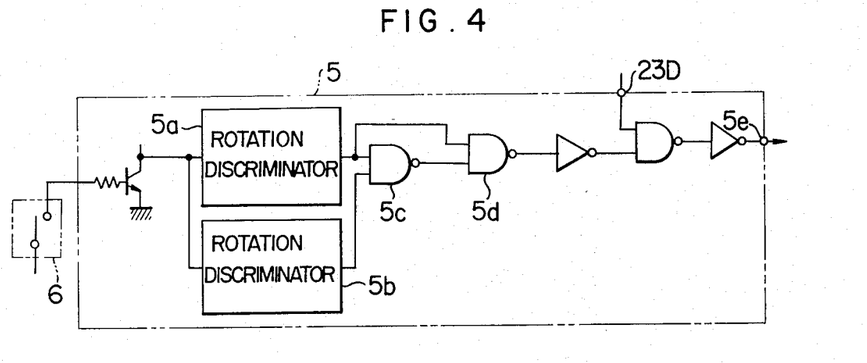
FIG. 4 is an electric circuit diagram of an embodiment of the rotation selector circuit.

Further, those systems for reading out various other compensating values but not shown in the figure are all of the similar structure to the system for reading out said correcting variable and writing it in the latch 17b. It is to be noted that the selection signal from the rotation selection circuit 5 is applied in the reading-out of the rotation compensation. An electrical connection diagram of this rotation selection circuit 5 is shown in FIG. 4. In FIG. 4, the rotation signal is derived from one contact in the distributor 6. The maximum and minimum rotations are discriminated in the analog type rotation discriminating circuits 5a and 5b formed of the circuit of T 1270 (trade name) of Tokyo Shibaura Electric Company, Ltd. The discrimination signal from the output of the discriminator circuits 5a and 5b are applied to NAND gates 5c and 5d to generate a selection signal at the output of said NAND gate 5d indicating that the engine rotation is in the range between said maximum and minimum. When such a selection signal is generated, the reset signal for the counter in the rotation compensating memory circuit 13, supplied from the terminal 23D is allowed to appear at an output terminal 5e. This output reset signal resets the counter in said rotation compensating memory circuit 13 to read out the rotation compensating value.

To the sum of this rotation compensating value, the acceleration increment compensating value, and the source voltage variation compensating value, the correcting value from the output of said latch 17b is added in the adder 18b. The added value is further added to the controlled variable from the latch 17a in the adder 18a to provide the digital total sum 18A of 10 bits at the output. Here, all of said adders 18a, 18b, 18c, and 18d are arranged to have 10 bits by combining adders $18a_1$, $18a_2$, $18a_3$, $18b_1$, $18b_2$, $18b_3$, etc. of 7453 (trade name) of TI.

Figure 5:
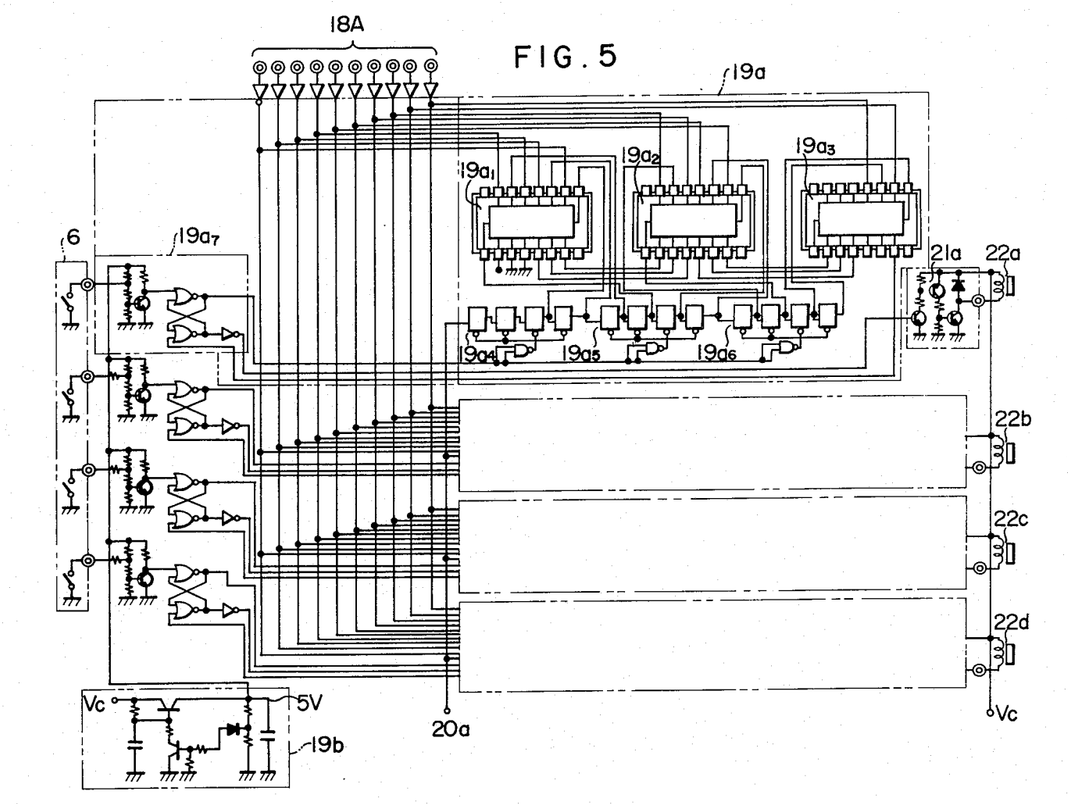
FIG. 5 is an electric circuit diagram of an embodiment of the partial circuit from the sum-time width converter circuit to the electromagnetic injector.

An electrical connection of the sum-time width converter 19 for converting the total sum 18A of 10 bits into a time width, the driving circuit 21, and the electromagnetic injector 22 are shown in FIG. 5. In FIG. 5, the distributor 6 is shown as switch contacts. The converter 19a comprises a combination of digital comparators $19a_1$, $19a_2$ and $19a_3$ of 7485 (trade name) of TI to have 10 bits, counters $19a_4$, $19a_5$, and $19a_6$ of 7493 (trade name) of TI, and an injection pulse initiating circuit $19a_7$. An injection pulse is generated at the output of the injection pulse initiating circuit $19a_7$. The injection pulse initiating circuit $19a_7$ includes a shaping circuit for the rotation signal from the distributor 6 which is supplied with electric power of 5 V from the power source circuit 19b. Said injection pulses are amplified by an amplifier 21a in the driving circuit 21 so as to allow an electric current to flow through the electromagnetic valve 22a through a source terminal $V_c$ to open the electromagnetic valve 22a and inject the fuel for a time width of said injection pulse. The pulse width of said injection pulse is determined by the relation between said total sum 18A and the frequency of the time converting clock pulses applied to a terminal 20a. Namely, said comparators $19a_1$, $19a_2$, and $19a_3$ compare the total sum 18A applied to one of their terminals with the counts of the counters $19a_4$, $19a_5$, and $19a_6$ which count said time converting clock pulses applied to the terminal 20a, and the pulse width is determined by the time from when these counters $19a_4$, $19a_5$, and $19a_6$ begin counting, synchronized with the rotation signal from the distributor 6, when the count amounts to said total sum 18A.

Figure 6:
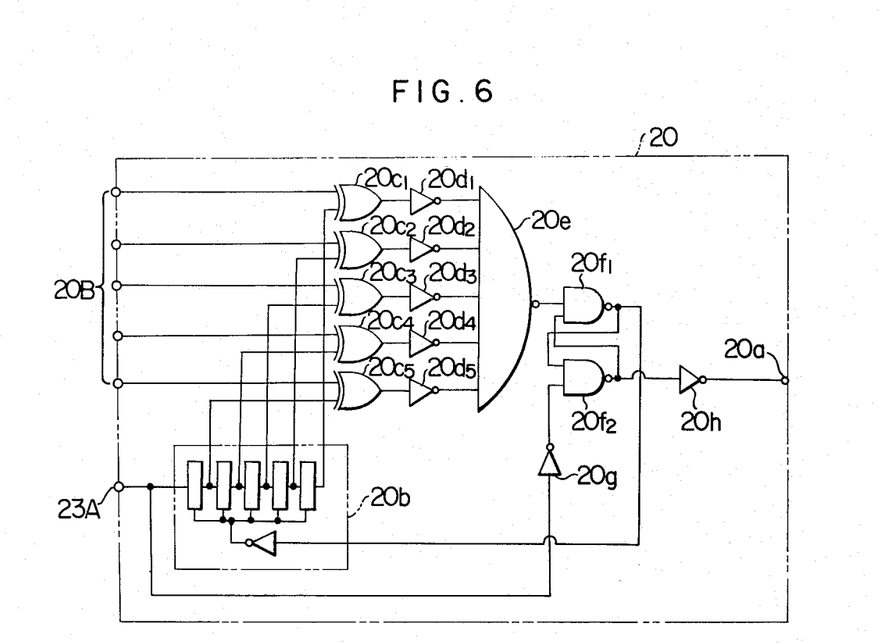
FIG. 6 is an electric circuit diagram of an embodiment of a temperature compensating controller circuit.

FIG. 6 shows the temperature compensating control circuit 20 for controlling the frequency of said time converting clock pulses which is a factor for determining the pulse width. In FIG. 6, input terminals 20B are applied with the output signal of the latch 17f in the injection latch circuit 17. The circuit 20 changes the frequency of the standard clock pulses 23A in accordance with said signal and generates the time converting clock pulses for temperature compensation at an output terminal 20a. In the figure, numeral 20b designates a counter, $20c_1$, $20c_2$, $20c_3$, $20c_4$, and $20c_5$ exclusive OR gates, $20d_1$, $20d_2$, $20d_3$, $20d_4$, and $20d_5$ inverters, 20e a NAND gate, $20f_1$ and $20f_2$ NAND gates forming a flip-flop, and 20g and 20h inverters.

Figure 7:
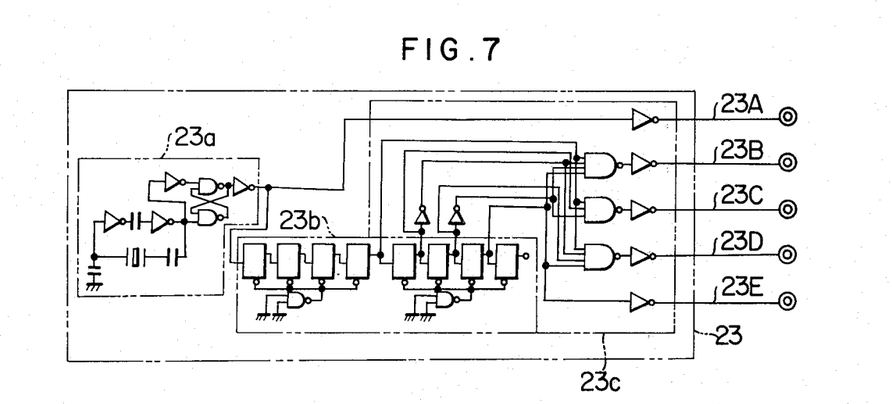
FIG. 7 is an electric circuit diagram of an embodiment of a synchronizing circuit.

FIG. 7 shows the electric connection of the synchronizing circuit 23 for generating various standard signals for the detection latch circuit 8, the injection latch circuit 17, the memory circuit 10, and the temperature compensating control circuit 20. In the figure, numeral 23a designates a crystal oscillator oscillating with a certain constant frequency, 23b a counter, 23c a gate circuit, and standard clock pulses, an injection write-in signal, a detection write-in signal, a reset signal, and a memory read-out signal, appear respectively at output terminals 23A, 23B, 23C, 23D and 23E. Said standard clock pulses are applied to the memory circuit 10 and the temperature compensating control circuit 20. Said injection write-in signal is applied to the injection latch circuit 17 to control the write-in operation. Said detection write-in signal is applied to the detection latch circuit 8 to control the write-in operation. Said reset and said memory read-out signals are applied to the memory circuit 10 to control the read-out operation.

Figure 8:
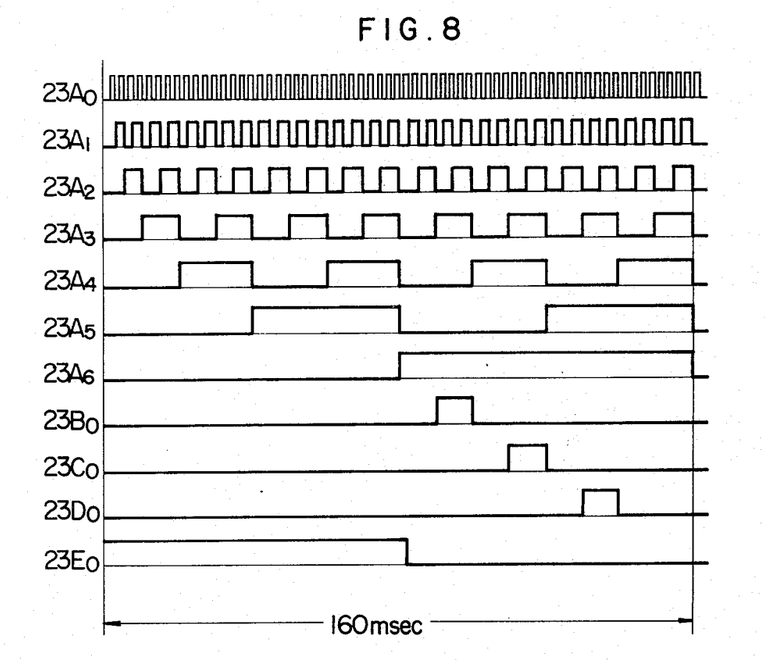
FIG. 8 shows voltage waveforms at various portions of the synchronizing circuit shown in FIG. 7.

The timing chart of the various signals generated from said synchronizing circuit 23 is shown in FIG. 8. The operation of the whole system will be described referring to this timing chart. A signal $23A_0$ is a 400 KHz signal from the oscillator 23a which works as the standard clock pulses of the present system, and signals $23A_1$, $23A_2$, $23A_3$, $23A_4$, $23A_5$, and $23A_6$ are frequency-divided signals. An injection write-in signal $23B_0$ is generated in the circuit formed by the counter 23b and a 4-input NAND gate in the gate circuit 23c and supplied to the clock inputs of the latches 17a and 17b. At the time when this clock level changes from 0 to 1, data on the input side of these latches 17a and 17b are transferred to the output side, but these data are stored in the flip-flops even when the clock level changes from 1 to 0. In this way, the digital data are sampled by the clock pulses and stored on the output side till the next clock pulse. Namely, a controlled variable of 5 bits is read out from the controlled variable memory circuit 11, written in synchronism with the latch 17a, and sent to the adder 18a by the clock signal. Similarly, the detection write-in signal $23C_0$ is supplied to the clock inputs of the latches 8a and 8b which act in a similar way to that of said latches 17a and 17b. These detection and injection write-in signals $23C_0$ and $23B_0$ are also sent to all other latches in the latch circuits 8 and 17 connected to the input and output sides of the memory circuit 10 as well as to said latches 8a, 8b and 17a, 17b. The memory read-out signal $23D_0$ works to read out the data in the diode matrix with the signals $23A_0$ and $23E_0$ and to send them to the latch 17a. The data selection will be described in detail. An analog signal from the negative pressure detector 1a is converted into a digital signal in the A-D converter 4 and distributed to an arbitrary one channel output among the 32 channels by the decoder 9a to determine the values of the abscissa of 32 bits. Here, the pattern is so made that at least one point in the ordinate direction of the matrix is switched on. The binary digital signal of 5 bits from the counters $11a_3$ and $11a_4$ and the decimal digital signal of the data in 32 channels are compared in the data selectors $11a_1$ and $11a_2$. When the two signals coincide each other, an output signal of 1 level is sent to the NAND gate $11a_6$ to give a signal to one input of the NOR gate $11a_7$ forming a flip-flop with the other NOR gate $11a_8$. On the other hand, the memory read-out signal 23D is supplied not only to the counters $11a_3$ and $11a_4$ but also to one input of the OR gate $11a_8$ and is normally on 0 level. When an arbitrary one data input among the 32 channels is selected in this state, the output of the flip-flop formed of the NOR gates $11a_7$ and $11a_8$ becomes of 0 level. Then, the output of the 3 input NAND gate $11a_5$, i.e. the clock signal, is not supplied to the counters $11a_3$ and $11a_4$ and the binary signal on the outputs of the counters is held. The recovery of the flip-flop is done when 1 level of the memory read-out signal arrives. Here, the time duration of 1 level, in the pulse signal 23E of 160 msec is 80 msec which corresponds to 32 clock pulses of the standard clock signal 23A and thus the data in the 32 channels can be read out. As a result, the decimal value at one point in the memory of the program portion $11a_0$ is represented by a binary digital signal of 5 bits which is sent to the latch 17a and written therein through the data selectors $11a_1$, and $11a_2$. The recovery of the counters $11a_3$ and $11a_4$ is done by a 1 level signal of the reset signal 23D. In the latch 17a, the data on the input side are transferred to the output side by the signal on the reversal of the injection write-in signal 23B from 0 to 1 level. The read-out of the auxiliary memory is done in completely the same manner; data in one of the 16 channels are selected, converted into a digital signal and sent to the latch 17b.

Figure 9:
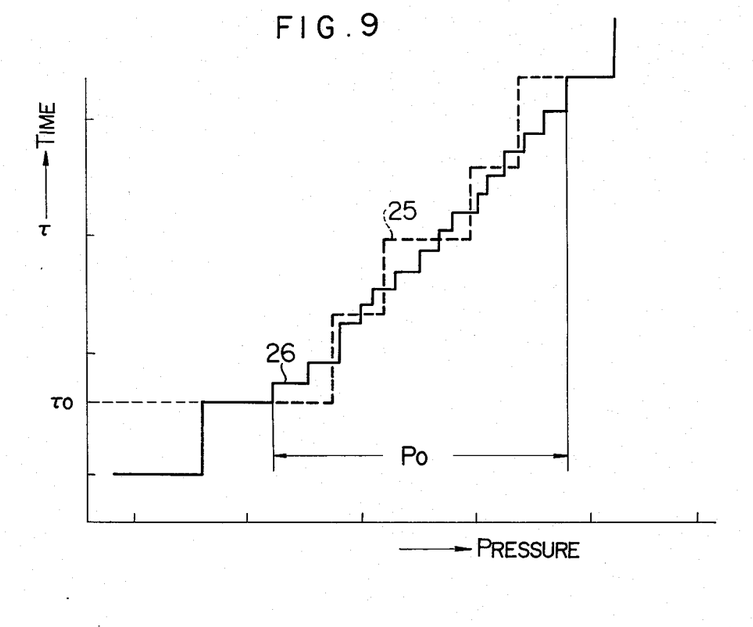
FIG. 9 shows characteristic diagrams showing embodiments of the pattern in the controlling memory circuit.
Figure 10A:
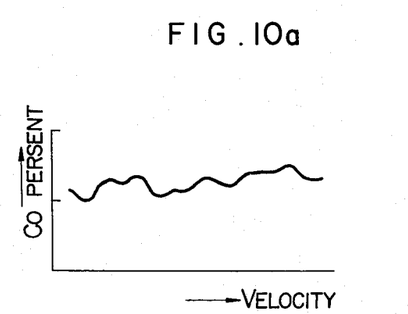
FIGS. 10a and 10b show examples of CO gas inclusion characteristic curves according to an embodiment of this invention and a conventional example respectively.
Figure 10B:
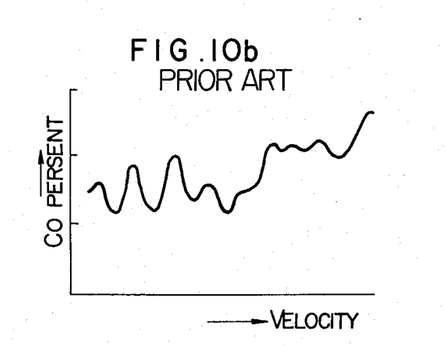

Further, description will be made referring to the characteristic diagrams and curves shown in FIGS. 9 and 10. When the pressure variation in the intake manifold of 140 to 760 mmHg to be represented by the abscissa in the main pattern portion $11a_0$ shown in FIG. 3 is dioded into 32 parts, the accuracy is about 20 mmHg/division. Similarly, the time length variation for the current flow 18 $\mu$sec to 10,510 msec represented by the ordinate is divided into 32 parts, the accuracy is about 332 $\mu$sec/division. In this case, the pattern introduced into the main pattern portion $11a_0$ shown in FIG. 3 is such as shown by dotted line 25 in FIG. 9. In FIG. 9, the abscissa represents the pressure P inside the intake manifold, the ordinate the time duration for current flow $\tau$, and $P_0$ the low load region. When an engine is activated according to this pattern, the compositional percentage of CO in the exhaust gas exhibits apparent variations as shown in FIG. 10b. This is caused by the fact that the accuracy of the digital approximation is 20 mmHg/division in the abscissa direction and 332 $\mu$sec/division in the ordinate direction. In FIG. 10, the abscissa represents the velocity of the record chart of the detector and the ordinate represents the CO percentage. In this system, the CO percentage variation is larger than that of the analog type fuel injection system. For decreasing the variation in the CO percentage, the fuel injection time in the idling region $P_0$ is set at a constant standard value $\tau_0$ in the main pattern portion $11a_0$ and an auxiliary pattern in which the region $P_0$ is extended is provided in the auxiliary program portion $12b_0$ as shown in FIG. 3. The output of the auxiliary pattern is added to said standard value $\tau_0$. When the pressure variation in the intake manifold from 250 to 400 mmHg is represented by the abscissa direction of the auxiliary pattern $12b_0$ and divided into 32 parts, the accuracy of the digital representation is 5 mmHg/division and is much improved compared to 20 mmHg/division of the main pattern $11a_0$. Similarly, when the time length variation in the ordinate direction is set from 18 $\mu$sec to 2591 $\mu$sec, the accuracy becomes 83 $\mu$sec/division and is much improved compared to 332 $\mu$sec/division of the main pattern $11a_0$. The auxiliary pattern $12b_0$ is set in such a manner that the injection time is nearest to the value obtained by subtracting the constant injection time $\tau_0$ in the idling region $P_0$ in the main pattern from the negative pressure-injection time characteristic required by the engine. When the main and the auxiliary patterns are set in the above manner, the additional result is as shown in solid line 26 in FIG. 9. Comparing with the dotted line 25, the solid line 26 has a higher accuracy only in the idling region $P_0$. As a result, the CO percentage in the exhaust gas becomes as shown in FIG. 10a which is more stable than that of FIG. 10b showing the result of the non-corrected pattern of the dotted line 25 in FIG. 9. The accuracy of this digital control system is compatible to that of the analog type fuel injection control. As is described above, high accuracy digital control for the fuel injection is made possible.

In the above embodiment, a fuel injection controller has been described, but this invention can be applied to other control systems such as the temperature control in a furnace.

What is claimed is:

1. A digital type electronic control system comprising; a detector for detecting the operational state of a controlled object and generating a detection signal; converter means connected to said detector for converting said detection signal into a digital signal; and controlled variable memory means connected to said converter means for reading out a controlled variable from a main pattern preliminarily set therein according to said digital signal, wherein the improvement comprises; auxiliary memory means provided with an auxiliary pattern preliminarily formed on fine division of a partial region of said main pattern, and connected to said converter means for reading out a correcting variable from said auxiliary pattern according to said digital signal; and adder means connected to said controlled variable memory means and said auxiliary memory means for adding said controlled variable and said correcting variable to achieve the characteristic control of said controlled object according to said sum.

2. A digital type electronic control system according to claim 1, in which said controlled object is an internal combustion engine.

3. A digital type electronic control system according to claim 1, in which the controlled characteristic of said controlled object is the fuel injection characteristic in an internal combustion engine.

4. A digital type electronic control system according to claim 1, in which the controlled characteristic of said controlled object is the temperature characteristic in a furnace.

5. A digital type electronic control system comprising; a detector for detecting the operational state of a controlled object and generating a detection signal; converter means connected to said detector for converting said detection signal into a digital signal; and controlled variable memory means connected to said converter means and preliminarily set with a main pattern, for reading out a controlled variable according to said digital signal, wherein the improvement comprises;
 auxiliary memory means preliminarily set with an auxiliary pattern formed on fine division of a partial region of said main pattern, and connected to said converter means for reading out a correcting variable form said auxiliary pattern according to said digital signal;
 the main and the auxiliary pattern being formed by the linear approximation at each step of said digital signal; and
 adder means connected to the outputs of said controlled variable memory means and said auxiliary memory means for adding said controlled variable and said correcting variable to achieve the characteristic control of said controlled object according to said sum.

6. A digital type electronic control system according to claim 5, in which said controlled object is an internal combustion engine.

7. A digital type electronic control system according to claim 5, in which the controlled characteristic of said controlled object is the fuel injection characteristic of an internal combustion engine.

8. A digital type electronic control system according to claim 5, in which the controlled characteristic of said controlled object is the temperature characteristic of a furnace.

9. A digital type electronic control system comprising; a detector for detecting the operational state of a controlled object and generating a detection signal; converter means connected to said detector for converting said detection signal into a digital signal; and controlled variable memory means connected to said converter means and preliminarily set with a main pattern for reading out a controlled variable from the main pattern according to said digital signal, wherein the improvement comprises;
  auxiliary memory means a preliminarily set with an auxiliary pattern formed on fine division of a partial region of said main pattern, and connected to said converter means for reading out a correcting variable from said auxiliary pattern according to said digital signal;
  the main and the auxiliary pattern being formed by the stepwise approximation at each step of said digital signal; and
  adder means connected to said controlled variable memory means and said auxiliary memory means for adding said controlled variable and said correcting variable to achieve the characteristic control of said controlled object according to said sum.

10. A digital type electronic control system comprising: a detector for detecting the operational state of a controlled object and generating a detection signal; converter means connected to said detector for converting said detection signal into a digital signal; and controlled variable memory means connected to said converter means and preliminarily set with a main pattern for reading out a controlled variable from the main pattern according to said digital signal, wherein the improvement comprises an auxiliary pattern preliminarily set on the basis of fine division of one part of said main pattern, and connecting means connected to said converter means for reading out the correction variable corresponding to said digital signal from said auxiliary pattern and for partially correcting characteristic control of said controlled variable by means of said correction variable.

* * * * *